March 11, 1969   C. P. BULLARD ET AL   3,431,600
NOZZLE SHUT-OFF VALVE FOR PLASTIC INJECTION MOLDING MACHINE
Filed Dec. 9, 1966   Sheet 1 of 2

INVENTOR.
CALVIN P. BULLARD
DAVID E. LUGINBUHL
BY
McCormick, Paulding & Huber
ATTORNEYS United States Patent Office 3,431,600
Patented Mar. 11, 1969

3,431,600
NOZZLE SHUT-OFF VALVE FOR PLASTIC
INJECTION MOLDING MACHINE
Calvin P. Bullard, East Longmeadow, Mass., and David E. Luginbuhl, Rockville, Conn., assignors, by mesne assignments, to Universal American Corporation (formerly Robfre Manufacturing Corporation), a corporation of Delaware
Filed Dec. 9, 1966, Ser. No. 600,429
U.S. Cl. 18—30
Int. Cl. B29f 1/00
6 Claims

ABSTRACT OF THE DISCLOSURE

A nozzle valve disposed outside the nozzle and which is normally rotatably supported by and between the end of the nozzle and the mold sprue structure for movement between open and closed positions by a fluid motor, but which can be moved to an inoperative position and rested there without removal from the molding machine when a nozzle valve is not needed.

---

As noted in the abstract, the invention relates to a valve for selectively permitting and preventing flow between the nozzle and the die or mold structure of a plastic injection molding machine. A nozzle shut-off valve amy be quite essential in the injection molding of articles using a molten plastic material which does not have a very high viscosity and in molding with a plastic which solidifies or "sets up" very rapidly. The use of a nozzle shut-off valve may not be necessary in injection molding with a plastic having a very viscous melt and in molding with a plastic which does not rapidly solidify.

If a nozzle shut-off valve is not used when one should be used, or if an inefficient shut-off valve is used, dribbling of the plastic material at the nozzle or at the sprue opening can occur when a molded part is removed from the die structure, and gummy, semi-solid strings of the plastic material can be left in the die structure when a molded part is removed. The strings remaining behind cause excessive die wear and can cause malformation of the next molded part or weaken its structure. In addition, the lack of a shut-off valve or of an efficient shut-off valve where needed can cause difficulty in subjecting the plastic melt to sufficient pressure within and back of the nozzle for proper injection into the die structure, and plastic material left in a nozzle tip can solidify or partly solidify and thus interfere with the next "shot" through the nozzle.

It is the general object of the present invention to provide a nozzle shut-off valve for a plastic injection molding machine of a positive type which closes at the end of the sprue structure and thus minimizes "stringing" through the sprue and reduces the possibility of strings being left in the die structure.

It is a more specific object of the invention to provide a nozzle valve which is disposed externally of the nozzle and which can be sealed by the force normally pressing the nozzle against the sprue, which does not require close fit within a housing to accomplish a seal, and which can easily be removed from its normal or operative position to an inoperative position without disassembly from the machine.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Figure 1:
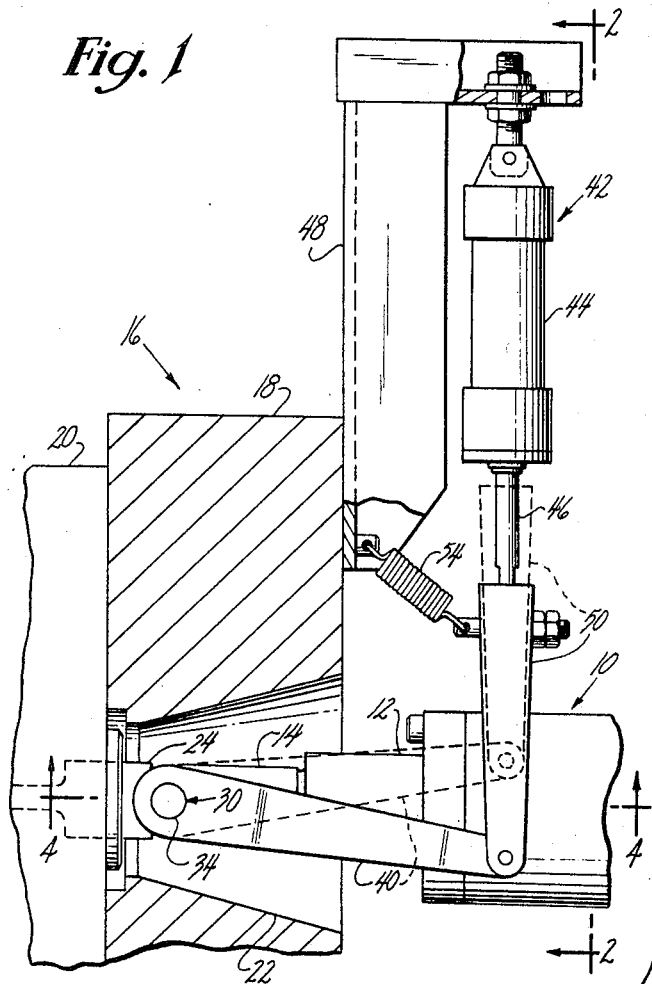
FIG. 1 is a side elevational view taken at the nozzle end of a plastic injection molding machine and showing a part of the die structure associated therewith in vertical cross-section.
Figure 2:
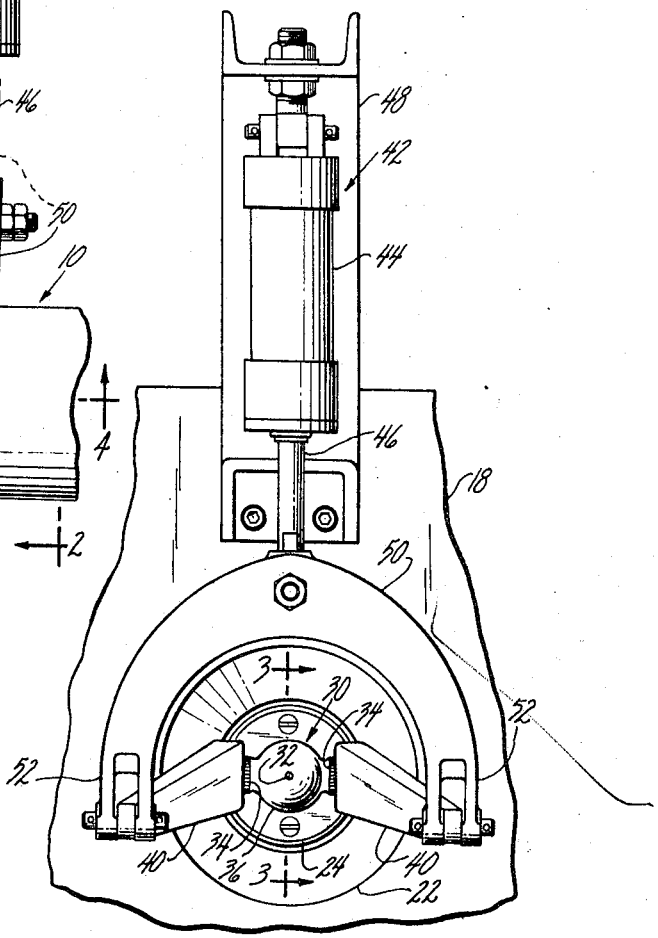
FIG. 2 is a transverse vertical view taken as indicated by the line 2—2 of FIG. 1, but with the nozzle structure removed to reveal details of the valve.
Figure 5:
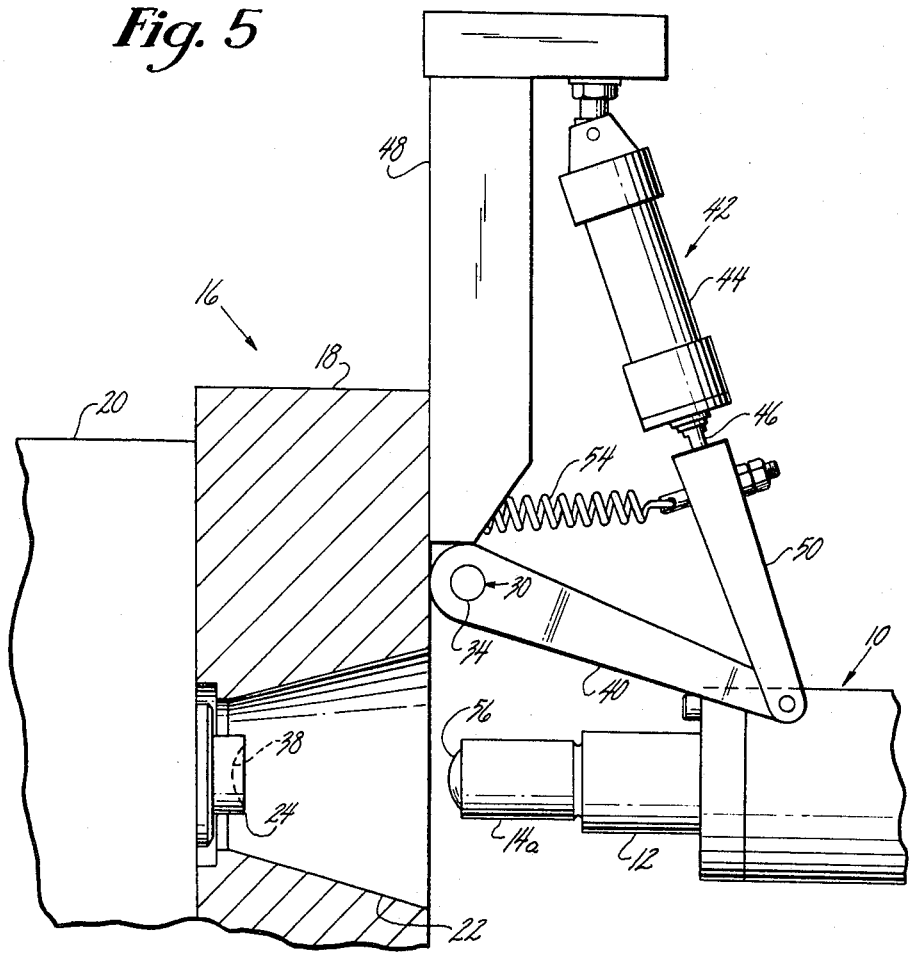
Figure 4:
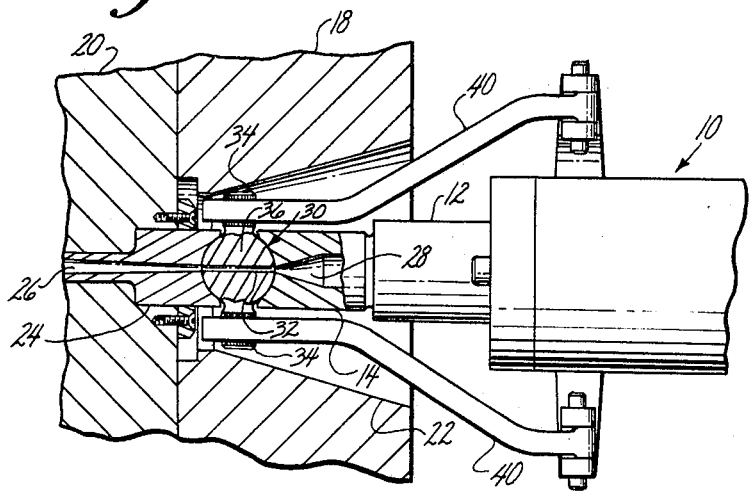

FIG. 4 is a horizontal cross-sectional view on the scale of FIGS. 1 and 2, being taken as indicated by the line 4—4 of FIG. 1; and FIG. 5 is a view similar to FIG. 1 but showing the nozzle valve located at its inoperative or "at rest" position and also showing the nozzle structure retracted relative to the die structure with a nozzle element substituted for operation when a nozzle shut-off valve is not required.

While the nozzle valve provided according to the present invention can be used in association with many different plastic injection molding machines, it can be used to particular advantage on a machine of the type shown in the Willert U.S. Patent No. 2,734,226 which issued Feb. 14, 1956. A machine of the type shown in that patent includes a heated barrel wherein a plasticizing worm or screw is reciprocably disposed. When the worm or screw is rotated, it plasticizes the plastic material within the heated barrel, causing it to reach a molten state, while moving it toward the front end of the barrel and into an injection nozzle secured to the front end. As the worm or screw packs the nozzle and front end of the barrel with the molten plastic, it is permitted to move axially rearwardly in the barrel by pressure of the molten pack in the front thereof. When it has moved rearwardly a sufficient distance to be certain that a sufficient quantity of plastic is in front of the screw to supply a mold cavity in a "shot," the screw is thrust forwardly by an hydraulic cylinder, like a ram, to inject or force the plastic through the nozzle and through the sprue structure or element of the die into the mold cavity defined within the die. Then, further rotation of the screw advances more plastic material for the next shot, and the cycle of operation is repeated.

In the accompanying drawings, the forward end portion of the heated barrel is shown and indicated by the reference number 10, and the nozzle element 12 having a tip 14 is shown secured to the front end of the said barrel. In a conventional construction, the barrel 10 is thrust forwardly by an hydraulic motor or other high force means toward a die structure which is indicated generally by the reference number 16 so that the nozzle tip will engage and be pressed against a sprue structure having a sprue opening communicating with the nozzle opening in its tip. Such a die structure may include a fixed vertical die plate 18 to which a die element or die half 20 is mounted. The die or mold half 20 is often referred to as the fixed die and it cooperates with a relatively movable die member (not shown) to define the mold cavity to be filled with the plastic material.

In keeping with conventional practice, the die plate 18 is provided with an opening 22 permitting the nozzle tip to be moved forwardly into engagement with the sprue which can be formed integrally on the die member 20 or which can be a separate part such as the sprue bushing 24 shown in the drawings. No matter how the sprue is formed, it defines a sprue passage 26 having a rearwardly facing opening and communicating with the mold cavity.

As mentioned above, the nozzle valve of the present invention is disposed between the nozzle tip 14 and the sprue bushing 24 selectively to permit or to prevent flow of the plastic from a nozzle passage 28 into the sprue passage 26. The nozzle valve provided according to this invention comprises a bar, which is indicated generally by the reference number 30, disposed between the forwardly extending end of the nozzle tip 14 and the rearwardly extending end of the sprue bushing 24. The axis or centerline of the valve bar 30 intersects the axes of the sprue and nozzle passages 26 and 28, the said bar being disposed transversely of the nozzle and sprue bushing.

Figure 3:
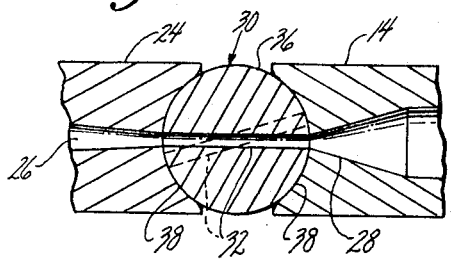
FIG. 3 is an enlarged vertical sectional view taken through the nozzle valve as indicated by the line 3—3 of FIG. 2 and showing a portion of the nozzle and the sprue element.

As best shown in FIGS. 3 and 4, the opposed ends of the nozzle tip and sprue are shaped to complement the shape of the central or intermediate portion of the valve bar 30 to rotatably support it, the said bar being clamped between the nozzle and sprue by the force normally used to extend the nozzle into engagement with the sprue. As has been said, this is a great force, and it is sufficient to seal the valve bar 30 between the nozzle tip 14 and the bushing 24. This sealing force is important, because the valve bar 30 has a passage 32 extending therethrough transversely to its axis to provide plastic flow communication between the nozzle passage 28 and the sprue passage 26. The valve bar is rotatably supported between the nozzle and sprue so that the passage 32 therein can be aligned with the nozzle and sprue openings to permit flow as shown in solid lines in FIG. 3 and so the said passage 32 can be moved out of alignment whereby the valve bar 30 prevents flow from the nozzle to the sprue as shown by the broken lines.

In a preferred form, the valve bar 30 has ends 34, 34 which extend outwardly of the nozzle tip and sprue bushing, and the intermediate portion 36 is spherically shaped. Thus, it is an easy matter to provide the end of the nozzle tip 14 and the end of the sprue bushing 24 each with a parti-spherical concave face 38 to journal the valve bar 30 at its intermediate portion 36 for rotation between its aforementioned open and closed positions. The external disposition of the nozzle valve and the parti-spherical shape avoids the necessity for the provision of a close tolerance seal fitting housing for the valve.

The splined ends 34, 34 of the valve bar 30 are used for connection of the valve bar to a pair of actuating arms or levers 40, 40. As best shown in FIGS. 1 and 4, the arms 40, 40 extend rearwardly to project out of the opening 22 in the valve plate 18 and their outwardly projecting ends diverge to straddle the nozzle 12 and forward end portion of the barrel 10.

The arms 40, 40 are operated to pivot the valve bar 30 on its longitudinal axis by a fluid motor 42 which preferably comprises an air or hydraulic cylinder 44 capable of reversible or reciprocable operation of a piston rod 46. The cylinder 44 is pivotally suspended from a bracket 48 which is secured to the rear face of the die plate 18, and a yoke 50 is connected to the bottom of the piston rod 46 to straddle the barrel 10. The yoke 50 has a clevis formation 52 at each of its ends to provide a pivoted connection with the free ends of the valve operating arms 40, 40. As best shown in FIGS. 1 and 3, when the air cylinder 44 is operated to extend the piston rod 46 downwardly, the valve bar 30 is pivoted about its axis to its open position, permitting plastic flow from the nozzle 14 to the sprue 24. When the piston rod 46 is retracted upwardly, the valve operating arms 40, 40 are moved to the broken line position shown in FIG. 1 and the valve bar 30 is rotated to the closed position shown by the broken line disposition of its passage 32 in FIG. 3.

As has been mentioned, it is not always necessary to use a throttle shut-off valve with a plastic injection molding machine. In keeping with this invention, the valve bar 30 can easily be moved from its operative position shown in FIGS. 1–4 to an inoperative or "at rest" position shown in FIG. 5. As will be seen in FIG. 5, when the valve bar 30 is to be removed from its operative position, it is only necessary to retract the barrel and nozzle relative to the die structure and to swing the valve bar 30 upwardly to a position wherein it will engage the face of the die plate 18 below the bracket 48 and above the die plate opening 22. A spring 54 is connected between the bottom of the bracket 48 and the top of the yoke 50 to bias the fluid motor structure 42 toward the die plate 18 and thus to retain the nozzle valve 30 in the inoperative or "at rest" position.

The barrell 10 and nozzle 12 are usually retracted in any event when changing from operation with one plastic material to operation with another plastic material for the purpose of purging the barrel and nozzle of the first used plastic. When the barrel is thus retracted, it is a simple matter to remove the nozzle tip 14 and to substitute another nozzle tip 14a (FIG. 5). The substituted nozzle tip 14a can be provided with a parti-spherical end 56 complementary to the concave face 38 on the sprue bushing 24. Then, when the barrel and nozzle are moved ahead again, the nozzle end face 56 can seat itself in the concave face 38 of the sprue bushing.

It will be quite obvious that when changing from operation with the nozzle valve of this invention to operation without a nozzle valve, the original nozzle tip 14 can still be used with a substitute sprue bushing provided with a parti-spherical rear face which can be seated in the concave face 38 of the nozzle tip 14. This may be the preferred substitution to make, because when changing from operation with a valve to operation without a valve, a new or different die is generally employed.

The invention claimed is:

1. A nozzle valve for a plastic injection molding machine of the type having a generally forwardly projecting nozzle for injecting molten plastic material into the generally rearwardly facing opening in a sprue element forming a part of associated die structure which defines a mold cavity for the plastic, said valve comprising a bar extending transversely of the nozzle opening and sprue opening on an axis intersecting the axes of said nozzle and sprue openings, said bar having a passage therein providing communication between said nozzle and sprue openings only when the bar is one rotated position on its axis, and the nozzle and sprue element being shaped to cooperate in journalling said bar for rotation on its axis, an arm connected to at least one end of said bar, and a reversible fluid motor mounted on said machine and connected to said arm to oscillate it on the axis of the bar by reversing the operation of the motor, thereby selectively rotating said valve bar into and out of its said one rotated position.

2. A nozzle valve as defined in claim 1 wherein an intermediate portion of said valve bar is spherically shaped and its passage is located in said intermediate portion, and wherein said nozzle and sprue element have opposed concave faces for journalling said bar at its intermediate portion.

3. The nozzle valve set forth in claim 1 wherein the valve bar is horizontally disposed, one of said arms is connected to each end of said bar, and the fluid motor is pivotally mounted on said machine over said nozzle and includes a yoke straddling said nozzle and pivotally connected to the free ends of said arms.

4. The nozzle valve of claim 3 wherein said nozzle can be moved rearwardly for removal of said bar, said bar can be swung upwardly on the pivot connections between said arms and yoke to rest against said die structure over said sprue element, and wherein a spring biases said pivotally mounted motor toward said die structure to retain said valve bar in its said rest position.

5. The nozzle valve set forth in claim 2 wherein the valve bar is horizontally disposed, one of said arms is connected to each end of said bar, and the fluid motor is pivotally mounted on said machine over said nozzle and includes a yoke straddling said nozzle and pivotally connected to the free ends of said arms.

6. The nozzel valve of claim 5 wherein said nozzle can be moved rearwardly for removal of said bar, said bar can be swung upwardly on the pivot connections between said arms and yoke to rest against said die structure over said sprue element, and wherein a spring biases said pivotally mounted motor toward said die structure to retain said valve bar in its said rest position.

References Cited

UNITED STATES PATENTS

| 2,367,204 | 1/1945 | Cousino | 18—30 |
| 2,952,041 | 9/1960 | Bernhardt | 18—30 X |
| 3,271,491 | 9/1966 | Mikkelborg | 18—30 X |

FOREIGN PATENTS

| 1,170,039 | 9/1958 | France. |

WILBUR L. McBAY, *Primary Examiner.*